Jan. 8, 1963
C. STARR
3,072,553
NUCLEAR REACTOR
Filed Feb. 24, 1948
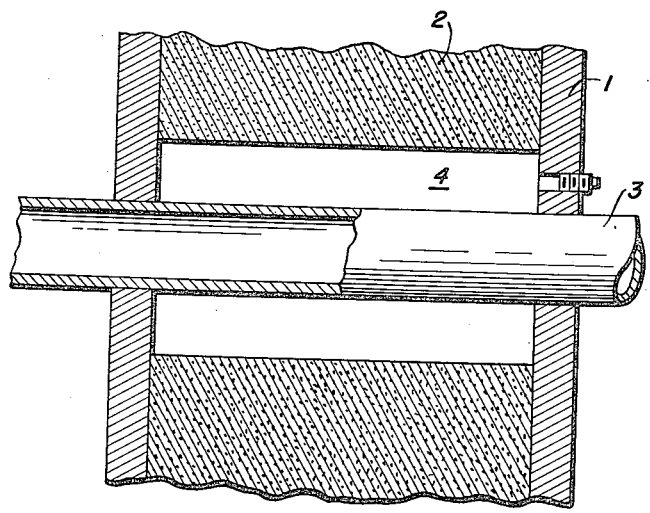
CHAUNCEY STARR
INVENTOR.
BY William R. Lane
ATTORNEY

United States Patent Office 3,072,553
Patented Jan. 8, 1963

3,072,553
NUCLEAR REACTOR
Chauncey Starr, Pacific Palisades, Calif., assignor to the United States of America as represented by the United States Atomic Energy Commission
Filed Feb. 24, 1948, Ser. No. 10,241
1 Claim. (Cl. 204—193.2)

This invention pertains to improvements in nuclear reactors.

In the past, difficulty has been experienced in the operation of nuclear reactor materials at high temperatures and with working fluids or gases of a chemically active nature, such a hydrogen or air. In this connection, because of the resulting deterioration of the various components, it is necessary to protect the reactor material.

Accordingly, it is an object of this invention to provide a reactor construction utilizing a protective film.

It is a further object of this invention to provide a chemically stable protective film which will reduce the deterioration of the reactor materials resulting from the working fluid or gas.

It is yet another object of this invention to provide a protective film capable of withstanding thermal stresses induced in the reactor resulting from the withdrawal of power from the reactor through heat transfer surfaces.

Other objects of the invention will become apparent from the following description taken in connection with the accompanying drawing, in which the single figure is a cross-sectional view through a portion of a reactor constructed in accordance with this invention.

Referring to the drawing, 1 represents a casing of a reactor containing reactor material 2, such as graphite impregnated with uranium compounds. Associated with the reactor is a heat transfer member such as a tube 3 for the passage of the heat transfer working fluid or gas, such as air or the like. The casing is so constructed as to provide a space 4 between the reactor material and the tube. This space serves as a separation layer and may be evacuated or filled with a chemically inert gas, such as helium. The separation layer also serves as a medium through which heat is transferred from the reactor material by radiation or conduction to the tube and the heat transfer fluid flowing therethrough. This separation layer may be as small as is practicable. Since there is no physical adherence between the tube 3 and the reactor material 2, thermal stresses due to differences in expansion are completely avoided.

Thus, for example, the graphite reactor 2, operating at approximately 2400° C., passes heat to a tube 3 by radiation and conduction through the helium medium 4. The tube is maintained at approximately 1800° C. by controlling the flow of the heat transfer medium therethrough.

It is clear that due to the physical separation of tube 3 and power producing material 2, the temperature of tube 3 may be varied over wide limits by adjusting the ratio of heat transferred to the working fluid of gas and the heat transferred through the separating layer 4. By means of this arrangement, tube construction of chemically resistant materials may be used. Further, even with operating temperatures in this range no unusual problem exists from the standpoint of thermal expansion of the tube material relative to the reactor material. Also, no problem exists as to any chemical reaction between the heat transfer medium and the reactor structure.

Although the accompanying drawing shows a tubular heat transfer surface, it is understood that any geometrical arrangement of such surfaces is permissible, such as plates or discs.

Although the invention has been described and illustrated in detail, it is to be clearly understood that the same is by way of illustration and example only, and is not to be taken by way of limitation, the spirit and scope of this invention being limited only by the terms of the appended claim.

I claim:

In combination a casing, a mass of graphite impregnated with uranium compounds in said casing, at least one coolant tube extending through said casing, said coolant tube being spaced from said mass, and helium in the space between the mass and the coolant tube.

References Cited in the file of this patent

UNITED STATES PATENTS

| | | |
|---|---|---|
| 2,708,656 | Fermi et al. | May 17, 1955 |
| 2,736,696 | Wigner et al. | Feb. 28, 1956 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

A General Account of the Development of Methods of Using Atomic Energy for Military Purposes, by H. D. Smyth, August 1945, pages 27, 50, 97, 103, 104, 177–180.

Goodman: "The Science and Engineering of Nuclear Power," vol. 1, pp. 275, 318, 319, 320, and 326, Addison-Wesley (1947).

Smith et al.: "Applied Atomic Power," pp. 152–159, Prentice-Hall (1946).